United States Patent [19]
Yang

[11] Patent Number: 5,255,407
[45] Date of Patent: Oct. 26, 1993

[54] MULTI-SCRUBBER TYPE ROLLER WINDSHIELD WIPER

[76] Inventor: Ming-Tung Yang, No. 4-3, Lane 97, Lung Chuan St., Panchiao, Taipei Hsien, Taiwan

[21] Appl. No.: 900,301

[22] Filed: Jun. 18, 1992

[51] Int. Cl.⁵ .............................. B60S 1/28; B60S 1/44
[52] U.S. Cl. ................................ 15/250.22; 15/250.41; 15/250.47
[58] Field of Search ............ 15/250.41, 250.22, 256.5, 15/48, 250.01, 250.02, 250.03, 250.04, 250.23, 250.25, 250.36, 250.37, 250.40, 250.42, 27, 48.1, 50.3

[56] References Cited

U.S. PATENT DOCUMENTS

| | | |
|---|---|---|
| 1,197,763 | 9/1916 | Plotnitzky ........................ 15/250.22 |
| 2,648,087 | 2/1952 | Kiker, Jr. ......................... 15/250.22 |
| 2,712,148 | 7/1955 | Cheshire .......................... 15/250.22 |
| 2,787,803 | 4/1957 | Cella ................................. 15/250.22 |
| 3,076,990 | 2/1963 | Dapprich ......................... 15/250.22 |
| 3,747,152 | 7/1973 | Tsuruzawa ............................ 15/48 |
| 3,892,006 | 7/1975 | Yasumoto ........................ 15/250.41 |
| 4,611,364 | 9/1986 | Grubner .......................... 15/250.22 |
| 4,930,180 | 6/1990 | Longman ......................... 15/250.42 |

FOREIGN PATENT DOCUMENTS

| | | | |
|---|---|---|---|
| 3602412 | 6/1986 | Fed. Rep. of Germany ... | 15/250.22 |
| 1162643 | 6/1985 | U.S.S.R. .......................... | 15/250.36 |
| 2201585 | 9/1988 | United Kingdom ............. | 15/250.22 |

*Primary Examiner*—Harvey G. Hornsby
*Assistant Examiner*—Gary K. Graham
*Attorney, Agent, or Firm*—Bacon & Thomas

[57] ABSTRACT

A windshield wiper is disclosed having a rotatable roller scrubber mounted on a roller retainer which is attached to the windshield wiper frame or blade. The roller retainer may have a semi-cylindrical configuration defining an internal space in which the roller scrubber is mounted. The roller scrubber has a plurality of elongated scrubbing strips and is located in the roller retainer such that one of the scrubbing strips extends outwardly of the assembly to bear against a window or windshield of the vehicle. A pair of roller retainers, each having a roller scrubber, may be attached to a single windshield wiper frame. Stops are located within the interior spaces of the roller retainers so as to enable each of the roller scrubbers to rotate in only one direction. The stops are located such that the roller scrubbers attached to a single windshield wiper frame rotate in opposite directions. Cleaning brushes extend into the internal spaces so as to clean the scrubbing strips as the roller scrubbers rotate.

4 Claims, 6 Drawing Sheets

MULTI-SCRUBBER TYPE ROLLER WINDSHIELD WIPER

BACKGROUND OF THE INVENTION

A windshield wiper commonly known is comprised of a wiper frame (1) and a scrubber strip (2) as shown on FIG. 1. Dust and sand particles adhere to the scrubber's surface when the car is parked in an outdoor atmosphere for an extended period of time. Also, air contaminated with a heavy content of waste oil and gas will stain the scrubber strip (2) with the oil dirt while car is running or parking along the road. Particles, especially ash, dust and sand particles, or oily dirt will definitely affect the scrubbing performance conducted by scrubber strip when the car is running in the rain. Furthermore, new ash dust and sand particles, or oil dirt may stick to the strip while the windshield wiper is being operated. We can conclude that the known windshield wiper, once installed on the car will create a hazardous condition of reduced visibility due to a bad scrubbing effect. An experienced driver may dismantle the windshield wiper and rinse the edge surface of the scrubber strip (2) to attain a clean surface to improve the scrubbing effect. However, it will be inconvenient for the driver to dismantle the windshield wiper too often. The first reaction for a new driver is to install a new windshield wiper at a service workshop because the wiper is damaged. It not only wastes money without any cause, but also the wiper's scrubbing effect can not last longer.

SUMMARY OF THE INVENTION

The design of a multiscrubber roller windshield wiper according to the invention is a wiper that can automatically clean its scrubber strip during the process of scrubbing and cleaning the windshield. It can simultaneously clean the windshield and the roller scrubber strip itself during the wiper's operation to constantly maintain the best scrubbing condition. Clear and safe driving visibility is guaranteed and the life cycle of windshield wiper is prolonged. The damage caused by dirt adhesion is eliminated.

DETAILED DESCRIPTION OF THE PREFERRED EMBODIMENTS

Figure 1:
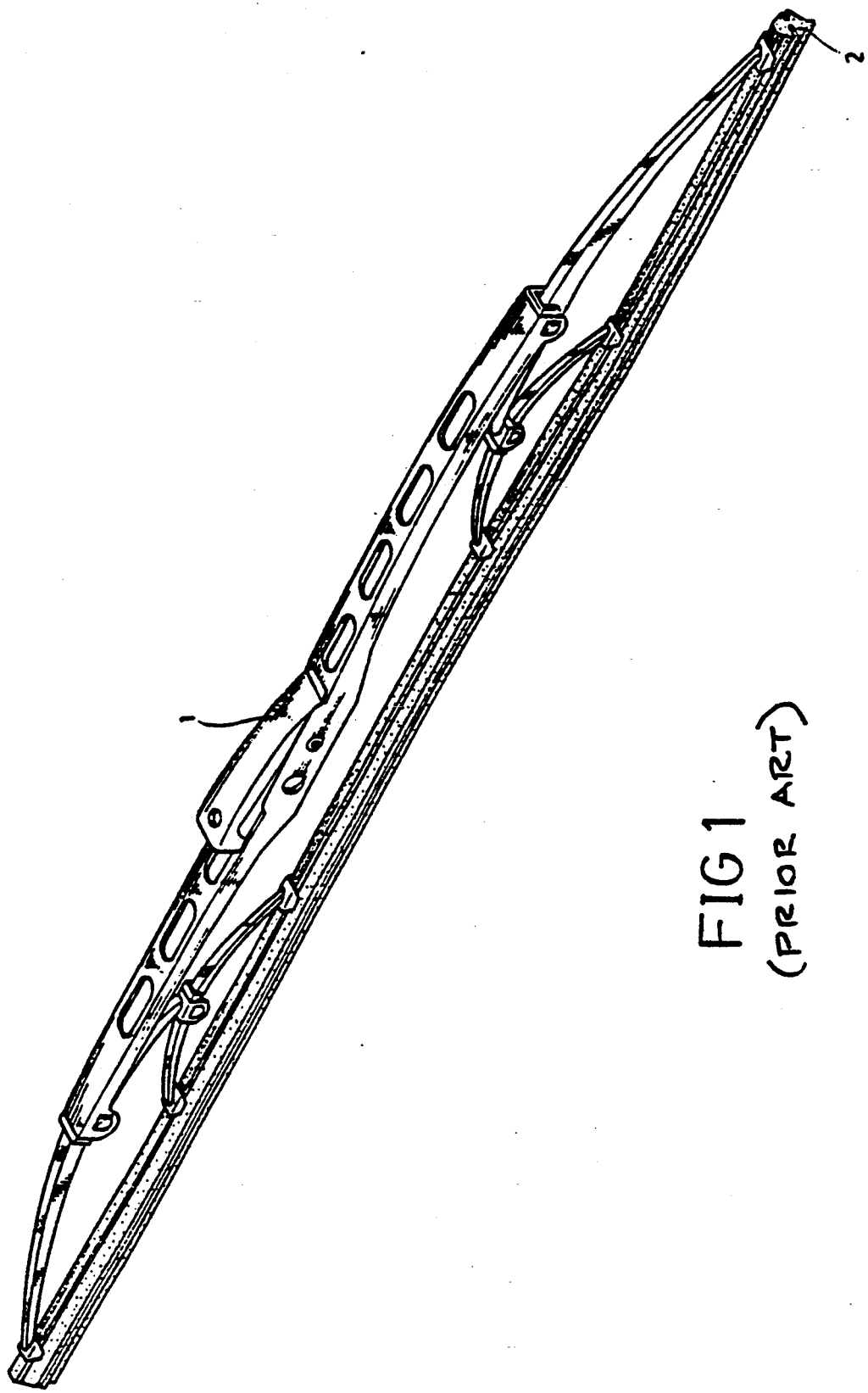
FIG. 1 is a perspective view of a known windshield wiper.
Figure 2:
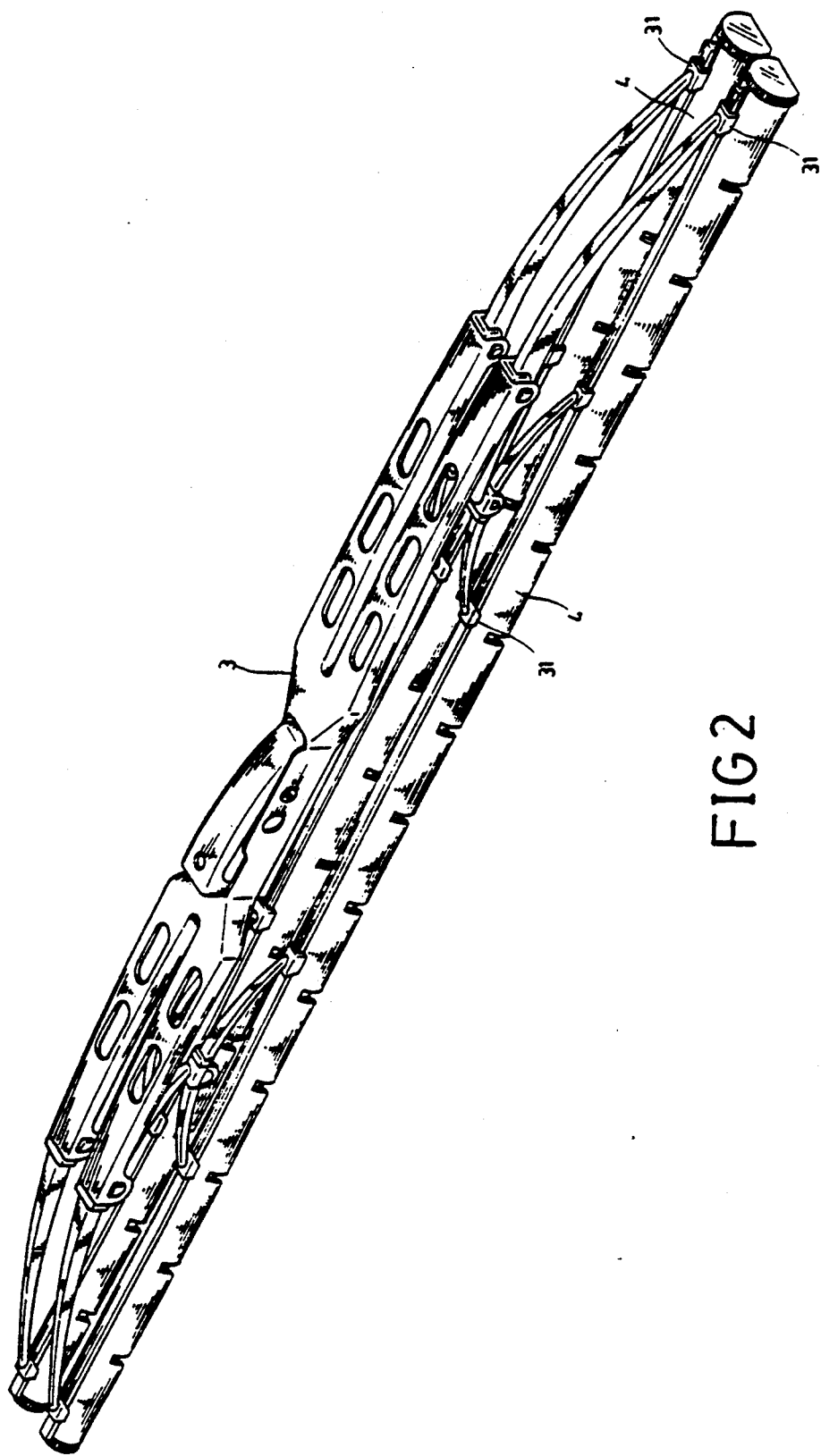
FIG. 2 is a perspective view of a windshield wiper according to this invention.
Figure 3:
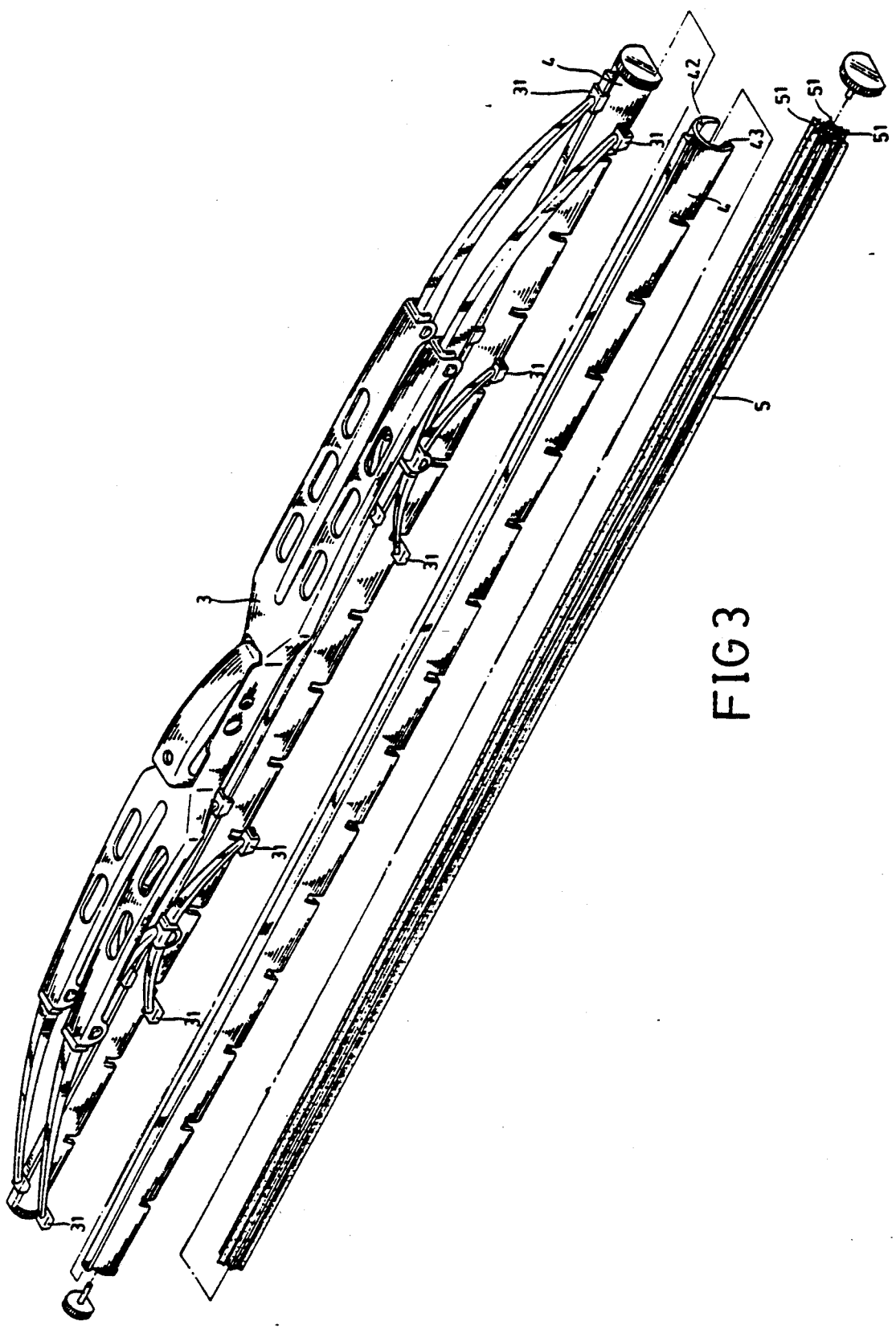
FIG. 3 is an exploded perspective view of the windshield wiper of this invention.
Figure 4:
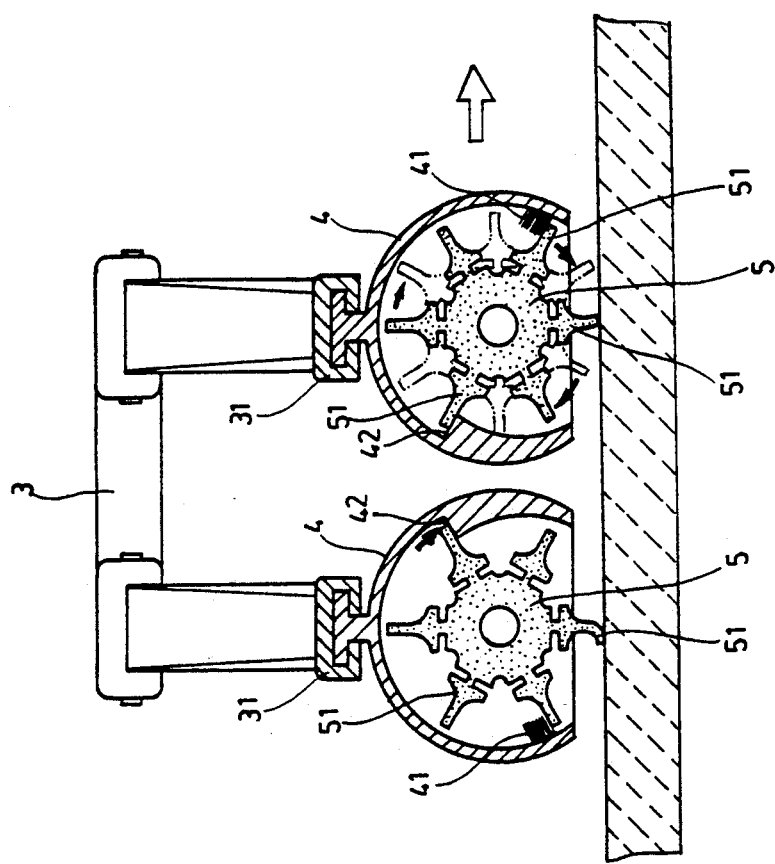
FIG. 4 is a cross-sectional view of the wiper of FIG. 2 showing the scrubbing and cleaning operation conducted by this invention.
Figure 5:
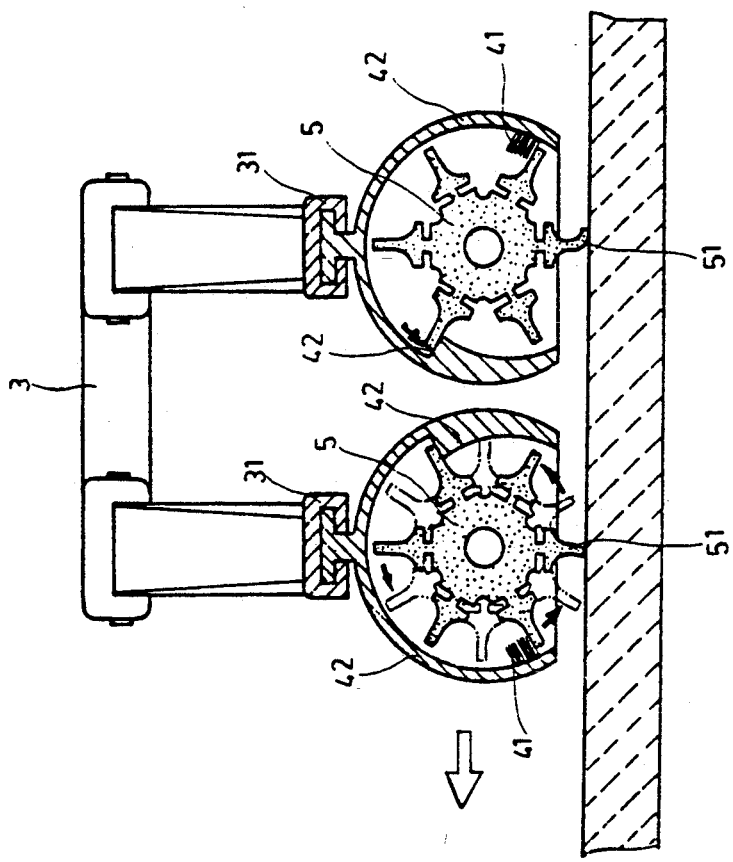
FIG. 5 is a cross-sectional view of the wiper of FIG. 2 showing the scrubbing and cleaning operation conducted by this invention.
Figure 6:
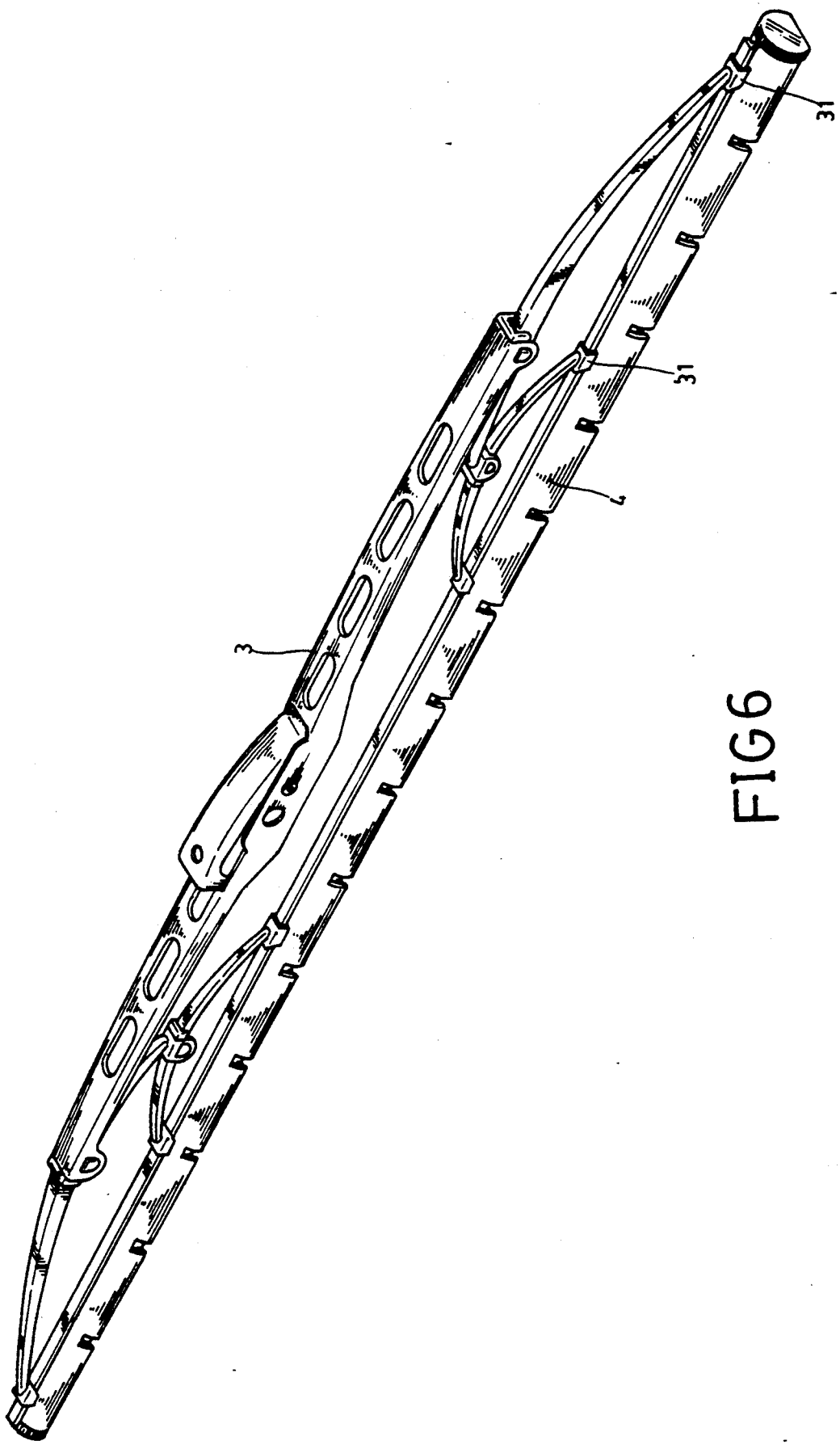
FIG. 6 is a perspective view of a single scrubber wiper according to this invention.

FIGS. 2 and 3 are assembled and exploded schematic drawings of a windshield wiper of the dual-scrubbing type. Clamping clips (31) located beneath wiper frame (3) are used to mount a set of roller retainers (4) and roller scrubbers (5). The roller retainers (4) are elongated and generally semi-cylindrically shaped. A T-shaped member at a ton edge is machined to fit the clamping clips (31) of the wiper frame (3). The generally semi-cylindrical shape configuration can proportionally match the scrubbing sector length produced on the arc-shaped windshield. Also, one side of the interior surface inside the roller retainer (4) is equipped with cleaning means (41), such as brush elements. Detergent can be applied if necessary, while the other side is equipped with a check stop (42). Please note that another roller retainer (4), in an opposite position has the locations of cleaning means (41) and the check stop (42) reversed. Roller scrubbers (5) are generally cylindrical rods having radial strips to form scrubbing strips (51). A movable shaft is retained in the roller retainer (4) and the scrubbing strips (51) such that the rods will be smoothly driven forward to rub the cleaning means (41) when the shaft is revolving in the roller retainer (4) and backward such that one of the scrubber strips (51) will be stopped at check stop (42). Ends of the roller scrubbers (5) are formed with two different sizes—one end is large while the opposite end is small. The differential of their outside diameter follows the curved arc of the windshield and the distance between up and down of the scrubbing sector which may terminate the rolling displacement vector difference caused by both ends while the strips are moved by following the sector's arc. An integrated structural assembly is achieved by inserting the T-shaped member of the roller retainer (4) and roller scrubbers (5) into the clamping clips (31) beneath the wiper frame (3). FIG. 4 shows the assembly's movement when this mechanism is installed on the windshield and its desired operation. The wiper mechanism is actuated to swing and scrub toward a certain direction (right hand side as illustrated in FIG. 4) while the lefthand roller scrubber (51) is stopped at check stop (42) of roller retainer (4) and cannot move even though the roller scrubber tends to revolve under such circumstances. The scrubber strip (51) located beneath the wiper can thus scrub and clean the screen in this fixed position. Meanwhile, the roller scrubber (5) on right hand side of the mechanism won't be affected by the check stop (42) of roller retainer (4) and can revolve which enables the scrubber strips (51) to be driven so as to rub cleaning means (41) to clean the scrubber strips (51). In other words, one of the two roller scrubbers is continuously scrubbing the screen, while the other one is cleaning the scrubber strips (51). When the wiper mechanism swings back to scrub the reverse direction (toward the left as shown in FIG. 5) the scrubber strip (51) on the right hand roller scrubber (5) is stopped at check stop (42) of roller retainer (4) and cannot move even though the roller scrubber tends to revolve so that the scrubber strip (51) located beneath the wiper can scrub and clean the screen in a fixed position. Meanwhile, the roller scrubber (5) at lefthand side of the mechanism won't be affected by the check stop (42) of roller retainer (4) and can revolve to enable the scrubber strips (51) to be driven against the cleaning means (41) to clean the scrubber strips (51). No matter how the screen scrubbing mechanism is operated, i.e. either forward or backward, these two wiper mechanisms can alternately and repeatedly have one wiper scrub the screen while the other one cleans scrubbing strips (51) in its reverse travel. An optimized screen scrubbing and wiper cleaning can be maintained all the time, so as to prolong its life cycle. Another advantage of this invention is to have not only two mechanisms incorporated to perform their desired function, but it also can have triple or quadruple mechanisms. Furthermore, a single mechanism including wiper frame (3), roller retainer (4) and roller scrubber (5), can be easily installed and utilized as shown in FIG. 6.

The roller retainer (4) is assembled to roller scrubber strips (5) so as to be flexible, and to be easy to dismantle and install to meet consumers' psychological demand.

The primary purpose of this invention is to provide a multiscrubber roller windshield wiper mechanism which can successfully perform its scrubbing and cleaning effect by its engineered structural configuration. Also, it can self-clean the roller scrubber strips during operation to as to constantly provide its best performance. Also, its life cycle is prolonged and its economic cost effect value is increased.

The secondary purpose of this invention is to utilize the unique structure of the roller retainers and roller scrubbers. Their repeated and sequential utilization and reduced damage rate are achieved from their sets of scrubber strips. Furthermore, an interior edge surface inside the roller retainer is equipped with cleaning means and a check stop which enable its roller scrubber strips to proceed with their cleaning action in one direction and their self-cleaning action in one direction and their self-cleaning action in another direction. Once two such mechanisms are installed symmetrically, in either direction will obtain screen scrubbing and self-cleaning effects to constantly maintain the best scrubbing and cleaning effectiveness.

I claim:

1. A windshield wiper for a vehicle having a windshield wiper frame comprising:

a) a pair of roller retainers each having an elongated, generally semi-cylindrical configuration defining an internal space;
b) attaching means to attach both of the pair of roller retainers to a single windshield wiper frame;
c) a pair of roller scrubbers, each having an elongated, generally cylindrical configuration with opposite ends of different diameters and a plurality of elongated scrubbing strips extending generally radially outwardly therefrom, each roller scrubber being rotatably attached to one of the roller retainers such that at least one scrubbing strip extends outwardly of the interior space; and,
d) stop means extending from each of the roller retainers into each interior space for contacting a scrubbing strip, said means preventing one of the pair of roller scrubbers from rotating in a first direction and the other of the pair of roller scrubbers from rotating in a second direction, said second direction being generally opposite to the first direction.

2. The windshield wiper of claim 1 further comprising cleaning means extending into the interior space of each roller retainer so as to clean the plurality of scrubbing strips as the roller scrubbers rotate.

3. The windshield wiper of claim 2 wherein the cleaning means comprises a brush.

4. The windshield wiper of claim 1 wherein the attaching means comprises:

a) a generally "T"-shaped member extending outwardly from each of the roller retainers; and,
b) clip means attached to the windshield wiper frame and defining a generally "T"-shaped slot adapted to receive the generally "T"-shaped members.

* * * * *